(12) United States Patent
Bech et al.

(10) Patent No.: US 8,047,792 B2
(45) Date of Patent: Nov. 1, 2011

(54) WIND TURBINE PITCH BEARING, AND USE HEREOF

(75) Inventors: Anton Bech, Ringkøbing (DK); Gerry Madden, Milton Keynes (GB)

(73) Assignee: Vestas Wind Systems A/S, Randers SV (DK)

( * ) Notice: Subject to any disclaimer, the term of this patent is extended or adjusted under 35 U.S.C. 154(b) by 827 days.

(21) Appl. No.: 11/994,805

(22) PCT Filed: Jul. 5, 2005

(86) PCT No.: PCT/GB2005/002612
§ 371 (c)(1),
(2), (4) Date: May 7, 2008

(87) PCT Pub. No.: WO2007/003866
PCT Pub. Date: Jan. 11, 2007

(65) Prior Publication Data
US 2008/0213095 A1   Sep. 4, 2008

(51) Int. Cl.
*F03B 3/14*   (2006.01)
(52) U.S. Cl. ............... 416/147; 416/204 R; 416/239
(58) Field of Classification Search ............ 416/147, 416/204 R, 210 R, 220 A, 239
See application file for complete search history.

(56) References Cited

U.S. PATENT DOCUMENTS

| | | | | |
|---|---|---|---|---|
| 1,998,407 A * | 4/1935 | Hackethal | | 416/147 |
| 2,017,505 A * | 10/1935 | Meon | | 416/147 |
| 2,109,696 A * | 3/1938 | Hackethal | | 416/147 |
| 2,315,574 A * | 4/1943 | Anderson | | 416/205 |
| 2,460,910 A * | 2/1949 | Sheets et al. | | 416/205 |
| 2,499,837 A * | 3/1950 | Sheets et al. | | 416/205 |
| 3,159,221 A * | 12/1964 | Gaubis et al. | | 416/207 |
| 4,201,514 A | 5/1980 | Heutter | | |
| 4,364,708 A | 12/1982 | David et al. | | |
| 4,431,375 A | 2/1984 | Carter, Jr. et al. | | |
| 4,668,109 A * | 5/1987 | Basso | | 384/518 |
| 6,158,897 A * | 12/2000 | Sivonen et al. | | 384/518 |
| 7,244,102 B2 * | 7/2007 | Delucis | | 416/156 |
| 7,927,019 B2 | 4/2011 | Yoshida et al. | | |
| 2002/0176781 A1 * | 11/2002 | Kuang | | 416/206 |
| 2003/0147751 A1 | 8/2003 | Wobben | | |
| 2004/0240997 A1 | 12/2004 | Wobben | | |

FOREIGN PATENT DOCUMENTS

DE   44 32 986   11/1995
(Continued)

OTHER PUBLICATIONS

International Search Report; PCT/GB2005/002612; Mar. 3, 2006.
(Continued)

*Primary Examiner* — Edward Look
*Assistant Examiner* — Aaron R Eastman
(74) *Attorney, Agent, or Firm* — Wood, Herron & Evans, L.L.P.

(57) ABSTRACT

The invention relates to a wind turbine including at least two pitch controlled wind turbine blades. Each blade has pitch bearings including two or more bearing rings, and pitch controlling means for pitching the blades by means of the bearings. The blades are mounted on a hub via the pitch bearings and the pitch bearings include separate flexibility enhancing means for controlling loads in the bearings.

13 Claims, 7 Drawing Sheets

FOREIGN PATENT DOCUMENTS

| | | |
|---|---|---|
| DE | 4432986 A1 | 11/1995 |
| DE | 20 2004 003 521 | 6/2004 |
| FR | 2291378 | 6/1976 |
| JP | 2003527535 T | 9/2003 |
| JP | 2005501195 T | 1/2005 |
| JP | 2005337267 A | 12/2005 |
| SE | 416990 | 2/1981 |
| WO | 03/064854 | 8/2003 |

OTHER PUBLICATIONS

Author Unknown; Notification of Reason for Refusal issued in corresponding Japanese Application No. 2008-518943; Mar. 2, 2011; 7 pages; Japanese Patent Office.

Author Unknown; Extracted English Translation of and published Japanese Patent Application No. 2004-045449; publication date Dec. 8, 2005; 16 pages.

* cited by examiner

WIND TURBINE PITCH BEARING, AND USE HEREOF

TECHNICAL FIELD OF THE INVENTION

The invention relates to a wind turbine and use hereof.

DESCRIPTION OF THE RELATED ART

A wind turbine known in the art comprises a wind turbine tower and a wind turbine nacelle positioned on top of the tower. A wind turbine rotor with three wind turbine blades is connected to the nacelle through a low speed shaft, which extends out of the nacelle front as illustrated on FIG. 1.

Modern wind turbines control the load on the rotor by pitching the blades in and out of the incoming wind. The blades are pitched to optimize the output or to protect the wind turbine from damaging overloads.

To perform the pitch each blade is provided with a pitch bearing between the hub and the blade, and some sort of mechanism, most often a hydraulic cylinder, to provide the force for pitching the blade and maintaining it in a given position. This pitching arrangement enables each blade to be turned approximately 90° around their longitudinal axis.

The wind load on the blades get bigger as modern wind turbines get bigger, and as both blades and hub get bigger the more relatively soft and flexible they get. These facts make the pitch bearings very crucial components of the rotor, in that they have to be able to transfer the moment produced by the wind load to the hub and at the same time enable that the blades can rotate freely and accurately.

To ensure this the obvious solution would be simply to make the pitch bearings bigger, but the bearing balls have already almost reached the limit of what is industrially available, and bigger balls would therefore be economically disadvantageous. Furthermore, the ring size would increase with increased ball size and thereby increase the bearing cost and weight significantly.

Another solution would be to provide the blade with more than one bearing spaced apart as shown in e.g. DE 3415428 A1 and U.S. Pat. No. 4,668,109. This is advantageous in that it enables relatively small bearings to transfer the moment. But this design is space consuming and requires a high degree of rigidity and thereby increased cost and weight of both the hub and the blades.

BRIEF SUMMARY OF THE INVENTION

The invention provides a large modern wind turbine pitch bearing without the mentioned disadvantages.

The invention particularly provides for a cost and weight efficient wind turbine pitch bearing which can transfer the loads on and from the blades to the hub without reducing the bearings durability or functionality.

That is, the invention provides for a wind turbine comprising at least two pitch controlled wind turbine blades. Each blade comprises one or more pitch bearings including two or more bearing rings, and pitch controlling means for pitching the blades by means of the bearings. The blades being mounted on a hub via the pitch bearings characterized in that, the one or more pitch bearings comprise separate flexibility enhancing means for controlling loads in the bearings.

It is advantageous to provide the pitch bearings with separate flexibility enhancing means, in that the flexibility enhancing means ensures the durability or functionality of the bearing even though the bearing rings are distorted by the load on and from the blades. Hereby the bearings can transfer a bigger moment or load without the weight or the cost of the bearing being raised much.

It should be emphasised that the term "hub" is to be understood as the part of the wind turbine to which the blades are attached. The term "hub" therefore also covers the teetering device to which the blades are attached on teeter wind turbines.

In an aspect of the invention, said bearings comprise two rows of rolling elements.

The more rows of rolling elements the more sensitive the bearings life and functionality are to a distortion of the bearing rings. It is therefore advantageous to provide a bearing comprising two rows of rolling elements with separate flexibility enhancing means.

It should be emphasised that the term "rolling elements" is to be understood as any form of rolling parts of a bearing such as balls, rollers, needles or other.

In an aspect of the invention, said bearings comprise three or more rows of rolling elements.

Hereby is achieved an advantageous embodiment of the invention.

In an aspect of the invention, said bearings comprise one or more first and one or more second separate flexibility enhancing means.

By providing the bearings with both a first and a second separate flexibility enhancing means the bearing becomes more flexible. This is advantageous in that it ensures the durability or functionality of the bearing even though the bearing rings are distorted.

In an aspect of the invention, said separate flexibility enhancing means are displaced from the load transferring surfaces of said bearing rings.

It is advantageous to position the separate flexibility enhancing means away from the surfaces of the bearing rings on which the rolling elements roll in that it enables a more simple design of the separate flexibility enhancing means and it enables the flexibility enhancing means to provide the bearing with more flexibility.

In an aspect of the invention, at least one of said one or more bearing rings comprise through holes for blade attachment means such as screws, bolts, studs or rivets.

It is advantageous that one or more of the bearing rings comprise through holes in that it enables a simple way of attaching the bearing.

In an aspect of the invention, said bearings comprise three bearing rings.

Bearings comprising three bearing rings always comprise at least two rows of rolling elements. The more rows of rolling elements the more sensitive the bearings durability and functionality are to a distortion of the bearing rings. It is therefore advantageous to provide a bearing comprising three bearing rings with separate flexibility enhancing means.

In an aspect of the invention, said separate flexibility enhancing means comprise at least one angle compensating mean.

Angle compensating means enables the rolling elements of the bearing to transfer the loads from one bearing ring to another even though one or more of the bearing rings are distorted and therefore not perfectly aligned. Angle compensating means are therefore advantageous in that they increase the bearings flexibility.

In an aspect of the invention, said at least one angle compensating mean is a separate 360° ring or more than one ring parts together forming a full 360° ring.

It is advantageous that the angle compensating means is a 360° ring or more than one ring parts together forming a full 360° ring in that the bearings form a 360° ring.

In an aspect of the invention, said at least one angle compensating mean is positioned so that at least one of said rows of rolling elements rolls on one first surface of said angle compensating mean and one second opposing surface of said angle compensating mean is in contact with the middle section of said bearing.

By placing the angle compensating mean between the rolling elements and its opposing contact surface on the middle section of a bearing ring, it enables the angle compensating mean to absorb or distribute any misalignment or angle differences between the rolling elements and their opposing contact surface on the middle section, whether that being a temporary, a permanent, a local or an overall misalignment or angle difference.

In an aspect of the invention, said first surface is a plane roller surface and said second opposing surface is a semicircular or substantially semicircular contact surface.

It is advantageous to provide the angle compensating mean with a plane roller surface for the rolling elements to roll on and an opposing semicircular contact surface facing the contact surface of the bearing, in that it enables the angle compensating mean to twist or distort locally or overall to absorb or distribute any misalignment or angle differences between the rolling elements and their opposing contact surface.

In an aspect of the invention, said separate flexibility enhancing means include one or more plates attached to one or more of said bearing rings by means of e.g. screws, bolts, studs, rivets, adhesive means or welding.

By providing the bearing rings with one or more plates it is possible to control the bearing rings rigidity and thereby ensure that even though the rings are distorted the bearings still have their full functionality and no part of the bearing is damaged or gets excessively strained.

In an aspect of the invention, at least one of said one or more plates is a strengthening plate providing additional non-uniform or substantially non-uniform rigidity to said bearing ring on which it is attached.

By making the plates so that they provide non-uniform rigidity to the bearing ring on which they are attached, the plates can provide the bearings with rigidity and/or flexibility where it is needed, without increasing the bearings weight much.

In an aspect of the invention, said additional non-uniform or substantially non-uniform rigidity is provided by means of one or more holes in said strengthening plates.

It is advantageous to provide the plates with one or more holes, in that it is a simple and efficient way of controlling the plates rigidity and/or flexibility In an aspect of the invention, said separate flexibility enhancing means comprises two or more radially separated rolling element cages.

It is advantageous to provide the bearings with several radially separate rolling element cases, in that it enables the possibility of varying distances between the cages and thereby increases the bearings flexibility.

In an aspect of the invention, said rolling element cages are separated by compression zones.

By separating the rolling element cages by means of compression zones the bearing becomes more flexible.

In an aspect of the invention, said compression zones are formed integrally in one or both longitudinal ends of said rolling element cages.

Forming the compression zones integrally in the ends of the rolling element cases is advantageous, in that it provides for a simple and cost efficient way of providing a bearing with compression zones.

In an aspect of the invention, said integrally formed compression zones are formed as transverse slits in the rolling element cages.

Transverse slits in the rolling element cages are a simple and cost efficient way of providing a bearing with compression zones.

In an aspect of the invention, facing transverse slits of juxtaposed rolling element cages are slit transversely from opposite sides.

By slitting the rolling element cages from opposite sides the facing slits together form a simple and efficient compression zone.

In an aspect of the invention, said compression zones are compression parts separate from said rolling element cages.

By using compression parts separate from said rolling element cages it is possible to use rubber blocks, springs or other as the compression zones. This is advantageous, in that it provides for a simple and cost efficient way of providing a bearing with compression zones.

In an aspect of the invention, said separate flexibility enhancing means includes hollow rolling elements such as hollow rollers.

By making the rolling elements hollow they become more flexible and therefore their ability to handle distortion and misalignment of the bearing rings is improved.

In an aspect of the invention, the hole in said hollow rollers has a larger diameter at the ends than in the middle.

Distortion and misalignment of the bearing rings results in, that one end of e.g. a roller has to transfer a bigger load than the rest of the roller. It is therefore advantageous to make the hole of a larger diameter at the ends and make the hole of a smaller diameter at the middle, to make the rolling element more rigid towards evenly distributed loads.

In an aspect of the invention, the hole in said hollow rollers is a straight through hole.

Providing the rollers with straight through holes is a simple and cost efficient way of providing the roller with enhanced flexible qualities.

In an aspect of the invention, the hole in said hollow rollers is a blind hole in one or both ends of said hollow rollers.

Providing the roller with blind hole in the ends, is a simple and cost efficient way of providing the rollers with enhanced flexible qualities and maintaining the rollers rigidity towards evenly distributed loads.

In an aspect of the invention, said separate flexibility enhancing means include rollers with varying diameter.

If the rollers are of varying diameter their ability to handle distortion and misalignment of the bearing rings is improved. This is advantageous in that it provides for a more flexible bearing.

In an aspect of the invention, said rollers are rounded in a longitudinal direction.

Rounding the rollers in a longitudinal direction is a simple and cost efficient way of providing the rollers with the ability to handle distortion and misalignment of the bearing rings.

In an aspect of the invention, said rollers bulge at the middle.

By making the rollers bulge at the middle, they are able to handle distortion and misalignment of the bearing rings more efficiently.

The invention further provides for a wind turbine comprising at least two pitch controlled wind turbine blades, each blade comprising one or more pitch bearings including two or more bearing rings, and pitch controlling means for pitching said blades by means of said bearings, said blades being mounted on a hub via said pitch bearings, characterized in that said pitch bearings comprise at least three rows of rolling elements, said rows having a common diameter.

Hereby is achieved an advantageous embodiment of the invention.

In an aspect of the invention, said pitch bearings comprise at least three further rows of rolling elements, said further rows having another common diameter.

Hereby is achieved an advantageous embodiment of the invention.

The invention further provides for use of a wind turbine where said wind turbine is a variable speed pitch wind turbine.

BRIEF DESCRIPTION OF THE FIGURES

The invention will be described in the following with reference to the figures in which FIG. 1. illustrates a large modern wind turbine as seen from the front.

DETAILED DESCRIPTION OF THE INVENTION

Figure 1:
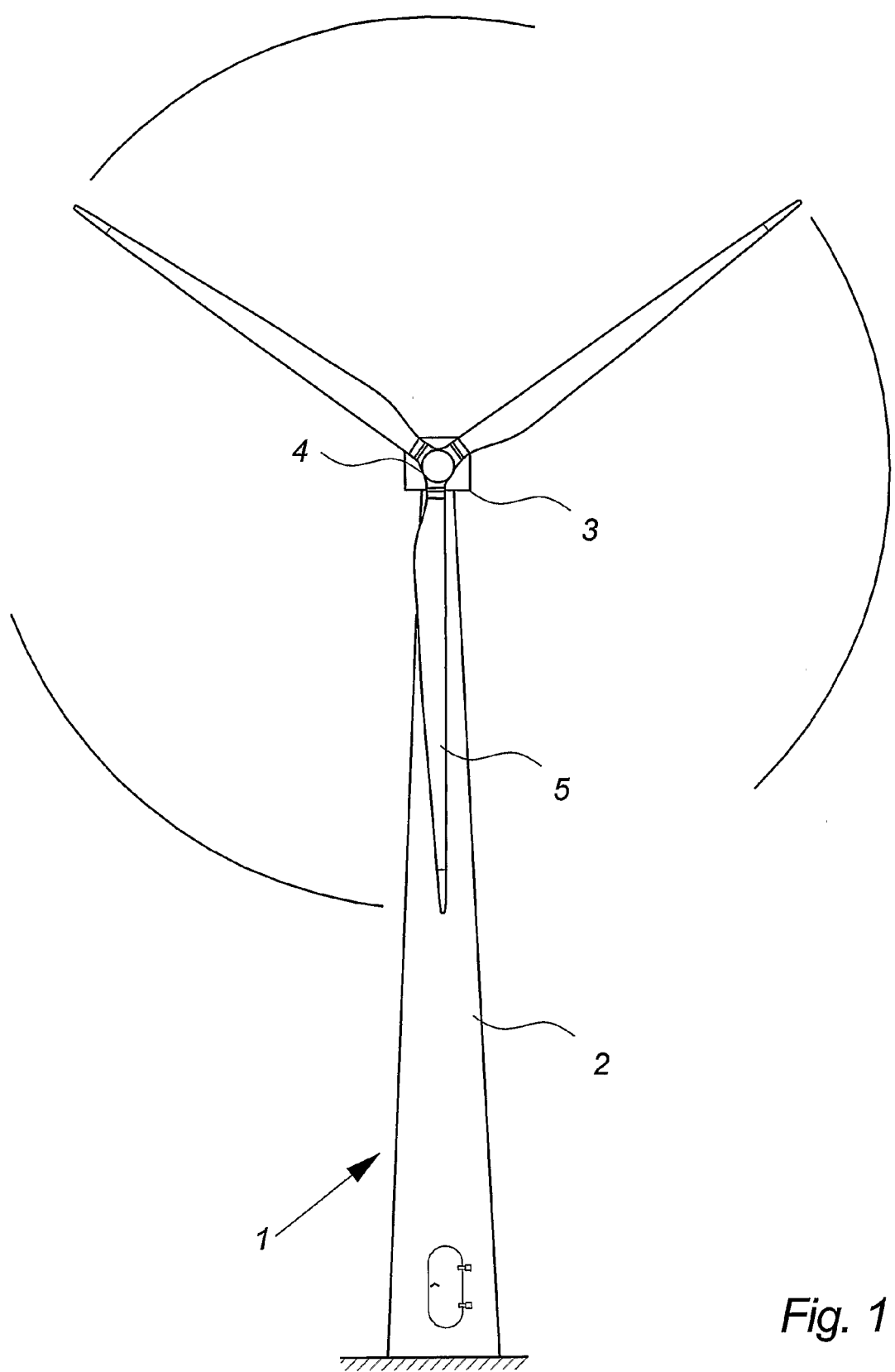

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
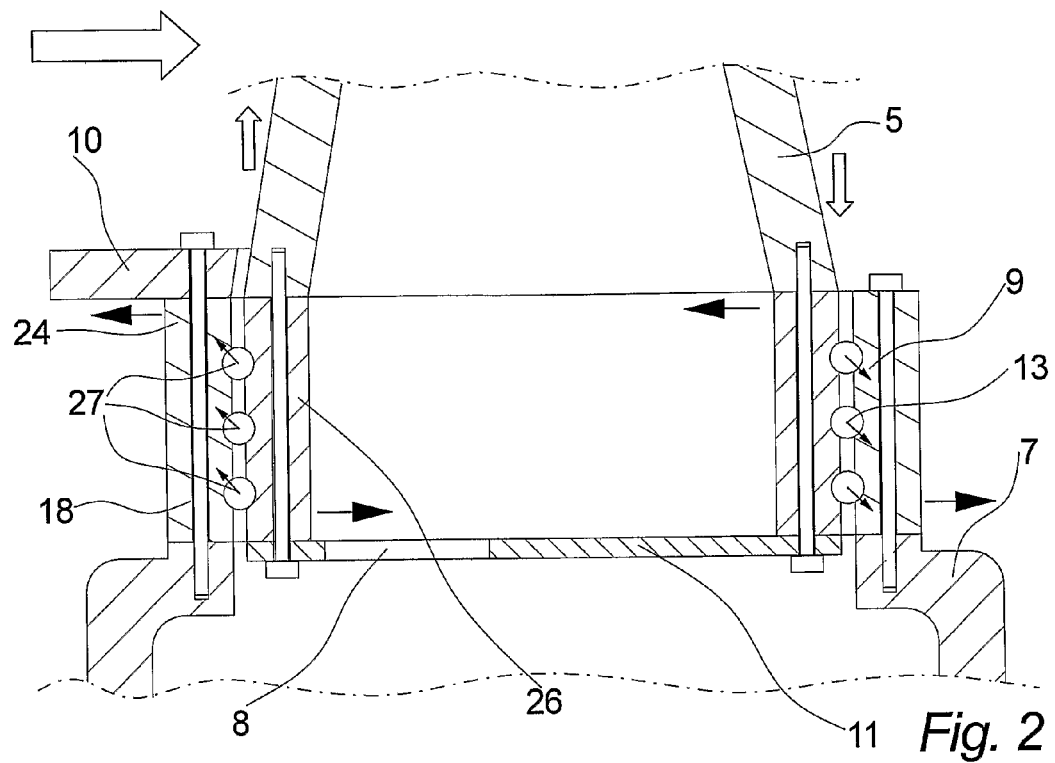
FIG. 2 illustrates a cross section of a wind turbine hub connected to a hub through a pitch bearing comprising plates.

FIG. 2 illustrates a cross section of a wind turbine blade 5 connected to a hub 7 through an embodiment of a pitch bearing 9. In this embodiment the pitch bearing 9 is a triple row 27 ball bearing, but it could also be a double or four rowed 27 bearing.

The pitch bearing has to transfer forces mainly from three different sources. The blade 5 (and the bearings 9 themselves off cause) is under constant influence of the force of gravitation. The direction of the gravitational force varies depending on the blades 5 position, inducing different loads on the pitch bearings 9. When the blade is in motion the bearing 9 is also under influence of a centrifugal force, which mainly produces an axial pull in the bearing 9. Finally the bearings 9 are under influence of the wind load on the blades 5. This force is by far the greatest load on the bearings 9 and it produces a massive moment, which the bearings 9 have to stand.

Since the pitch mechanism on traditional pitch wind turbine 1 usually can pitch the blade 5 a little over 90°, the load on the pitch bearings 9 is far from uniform under normal operation. The wind load on the blade 5 will make the blade 5 pull in the part of the inner ring 26 of the bearing 9 facing the wind and push on the part of the inner ring 26 facing away from the wind. When the inner ring 26 is pulled forcefully by the blade 5 the balls are pushed outwards and upwards in an angle of approximately 45° as indicated by the arrows. This force will result in an axial pull in the outer ring 24 and a radial push on the outer ring 24. Since the bottom of the outer ring 24 is fixed against the hub 7, the top of the ring 24 will have a tendency to deflect. Likewise will the inner ring 26 have a tendency to deflect at the bottom, since it is fixed against the blade at the top. If this deflection becomes too big, one or more of the rows 27 will be unable to transfer the loads, which could lead to a damaging load on the remaining balls. Because of the direction of the forces this problem is most pronounced at the part of the bearing facing the wind. This deflection could be reduced by making the rings thicker and therefore more rigid, but this would increase the cost and the weight of the bearing significantly.

Multi-rowed ball bearings are relatively cheap due to the well proven and relatively simple design, but they have the disadvantage of being relatively high in relation to the width, making them relatively poor regarding the transfer of large moment forces.

FIG. 2 therefore illustrates that the free end of the outer ring 24 is provided with an outer plate 10. The outer plate 10 is fixed to the outer ring 24 and thereby enables the possibility of providing the outer ring 24 with rigidity where it is needed. Likewise, the inner ring 26 is provided with an inner plate 11. To ensure flexibility of the inner plate 11 in the right places, the plate 11 is provided with a hole 8, allowing for the inner ring 26 to deflect a little at the bottom to compensate for a little deflection at the top of the outer ring 24, and thereby ensuring a constant distance between the two rings 24, 26 and a substantially identical load on all the rows 27 of balls 13.

Figure 3:
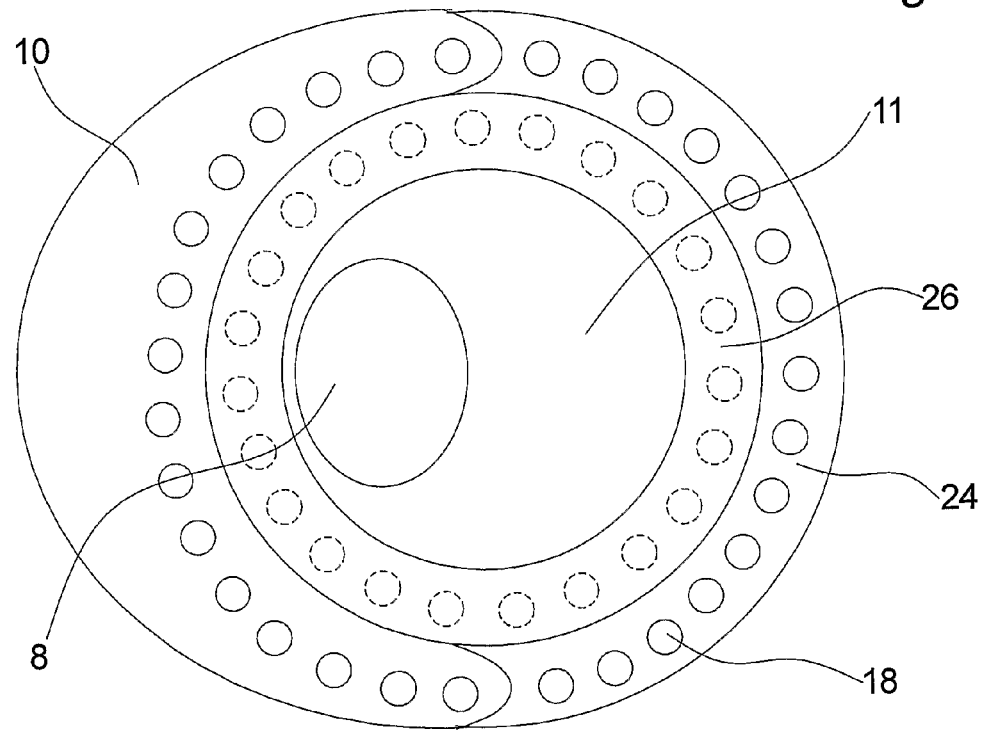
FIG. 3 illustrates the same embodiment of a pitch bearing as illustrated in FIG. 2 as seen from the top.

FIG. 3 illustrates the same embodiment of a pitch bearing as illustrated in FIG. 2 as seen from the top. In this embodiment of the invention the outer plate 10 is shaped as an annular semicircular ring with increased width towards the middle of the semicircle. This design ensures most rigidity where the deflection of the outer ring 24 is biggest. In this embodiment of the invention the outer plate 10 covers approximately 180° of the outer ring 24 but in another embodiment the outer plate could cover more or less of the outer ring 24 or it could be formed as a full 360° annular ring. In another embodiment of the invention the outer plate 10 could also be of constant width.

FIG. 3 also illustrates that the inner plate 11 is provided with a plate hole 8 shaped as an ellipse. The hole 8 is also placed near the part of the bearing 9 where the load on the outer ring 24 is biggest. In another embodiment of the invention the hole 8 could have another shape such as circular, polygonal or the flexibility could be provided by means of a number of strategically placed holes 8.

Figure 4:
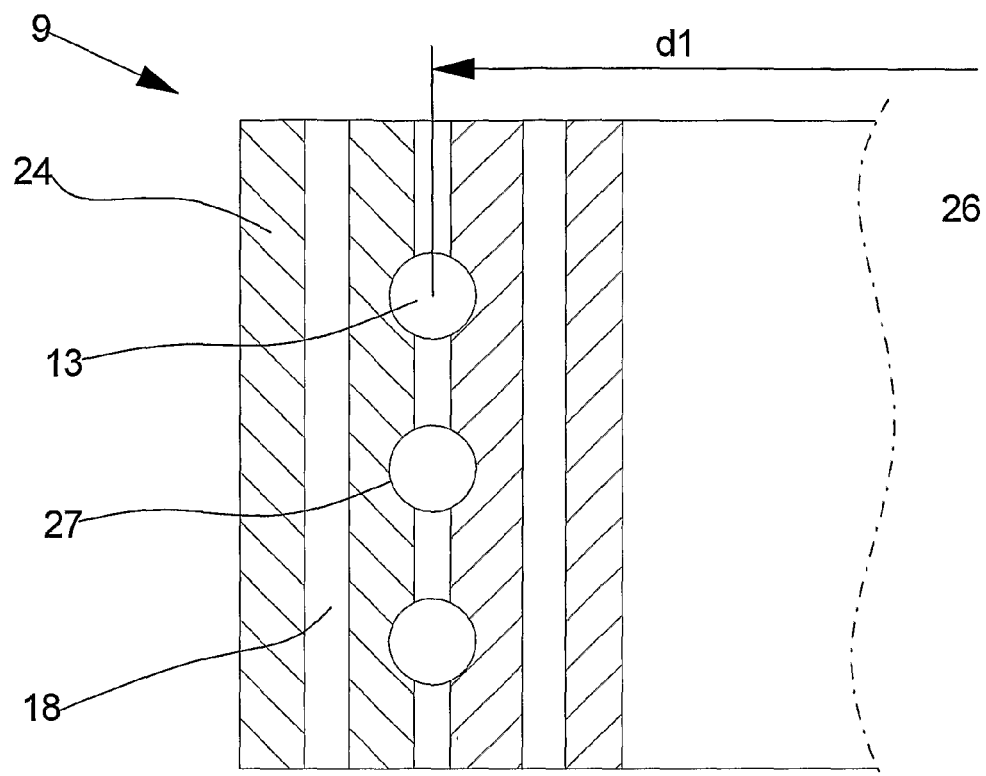
FIG. 4 illustrates a part of a cross section of a pitch bearing comprising three rows of rolling elements.

FIG. 4 illustrates a part of a cross section of a pitch bearing 9 comprising three rows 27 of rolling elements 13. In this embodiment of the invention the pitch bearing 9 comprise an outer bearing ring 24 and an inner bearing ring 26. The figure further illustrates that the bearing 9 comprise three rows 27 of balls 13. The three rows of rolling elements 13 have the same diameter as illustrated by d1.

Figure 5:
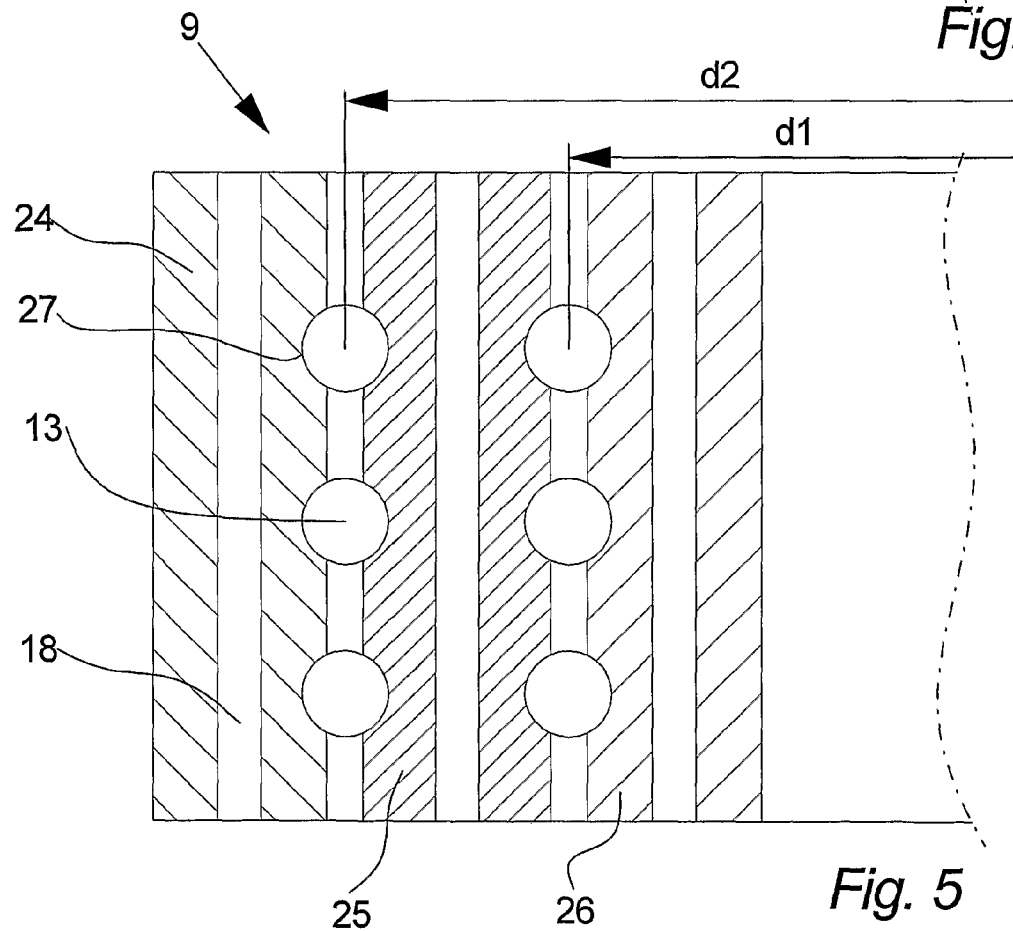
FIG. 5 illustrates a part of a cross section of a pitch bearing comprising six rows of rolling elements.

FIG. 5 illustrates a part of a cross section of a pitch bearing 9 comprising two columns of each three rows 27 of rolling elements 13. Between the outer bearing ring 24 and the centre bearing ring 25 is positioned three rows 27 of balls 13 on the same diameter d2. Between the centre bearing ring 25 and the inner bearing ring 26 is positioned three other rows 27 of rolling elements 13 on a common diameter d1, which is different from d2.

Figure 6:
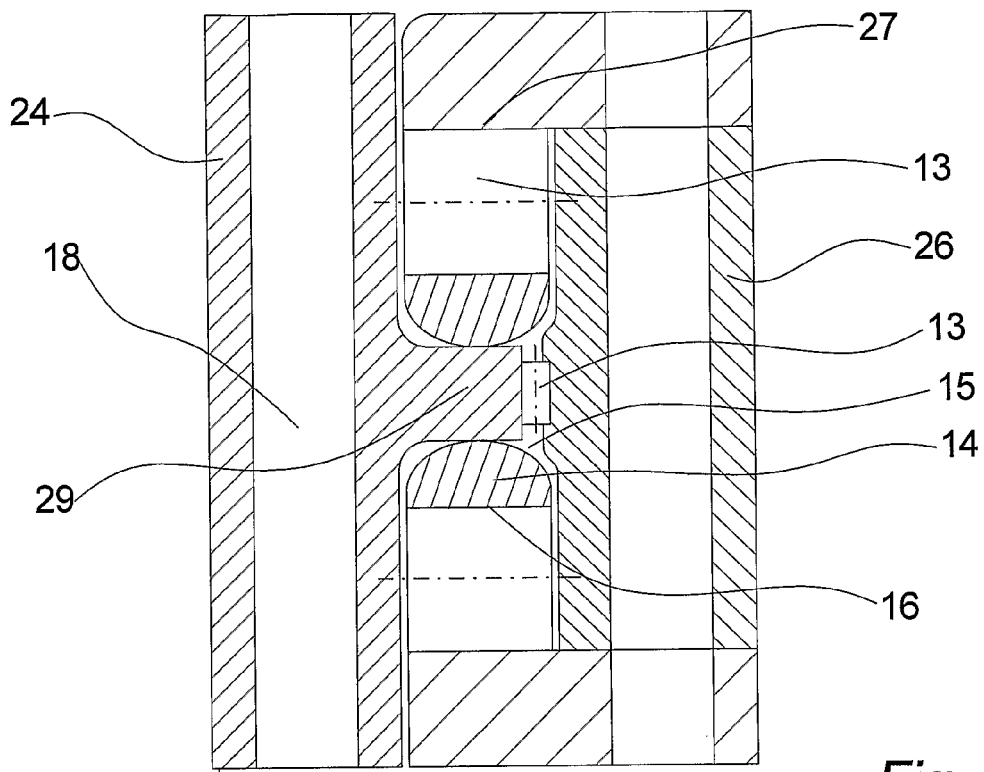
FIG. 6 illustrates a part of a cross section of a pitch bearing comprising angle compensating means.

FIG. 6 illustrates a part of a cross section of a pitch bearing 9 comprising angle compensating means 14. On an ordinary bearing 9 of this type the top and/or the bottom row 27 of rollers 13 would press against the middle section during normal operation. To ensure long life of the rollers 13 and the bearing 9, the transferred load has to be distributed evenly over the entire roller surface. This could be ensured if the rings were made very strong and rigid, but this would also mean a significant increase in cost and weight.

FIG. 6 therefore illustrates that the bearing 9 is provided with angle compensating means 14 in the form of two separate rings provided with a plan surface 16 facing the rollers 13 and a semicircular surface 15 facing the middle section 29. In another embodiment of the invention the plane surface 16 could be provided with a groove, in which the rollers 13 would roll and/or the semicircular surface 15 could be formed as a plane surface with more or less rounded corners.

The angle compensating means 14 could be made of hardened steel, but it would still be so flexible, that it can twist a little to compensate for any angle differences between the roller surface and the opposing surface on the middle section 29.

Figure 7:
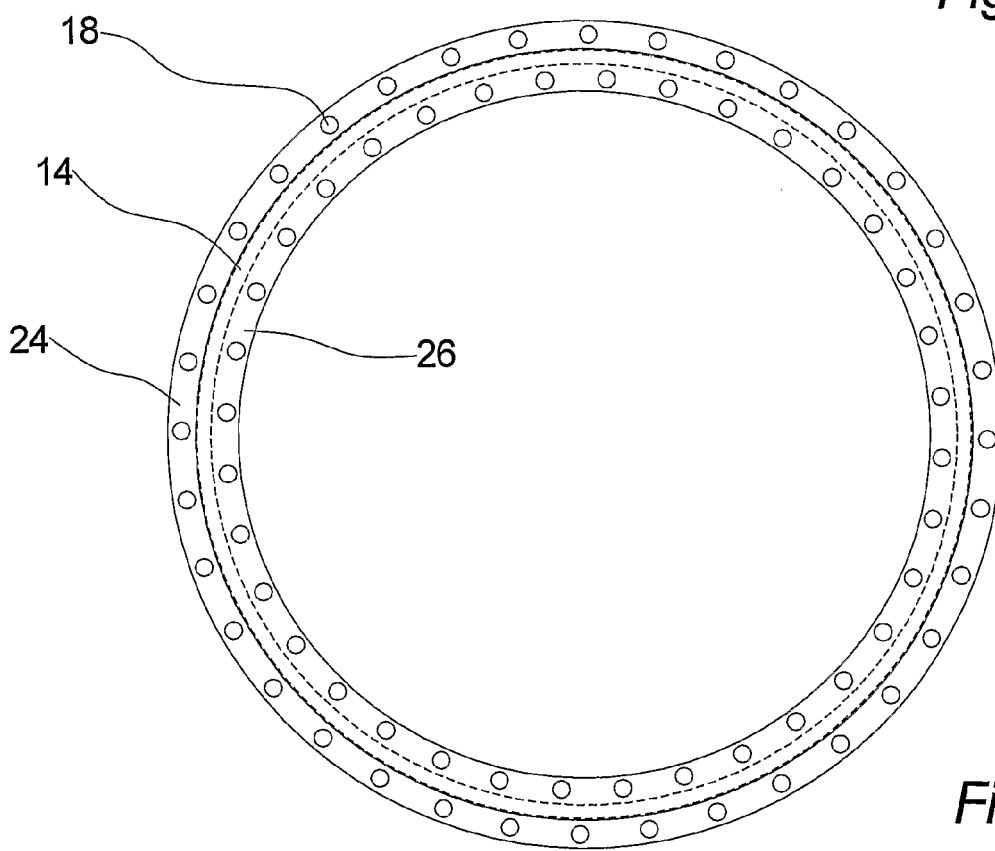
FIG. 7 illustrates the same embodiment of a pitch bearing as illustrated in FIG. 6 as seen from the top.

FIG. 7 illustrates the same embodiment of a pitch bearing as illustrated in FIG. 6 as seen from the top. The angle compensating means 14 is illustrated in dotted lines as one full 360° ring. In another embodiment of the invention the angle compensating means 14 could be made of several individual or joined ring parts e.g. to lower the production costs.

Figure 8:
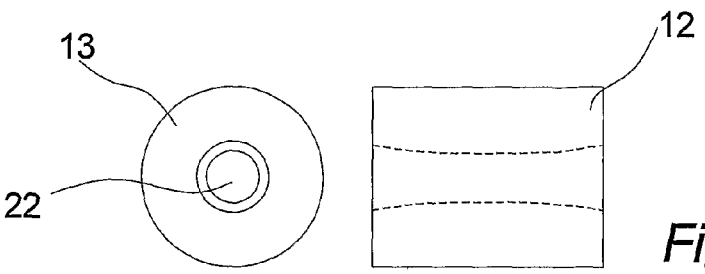
FIG. 8 illustrates an embodiment of a hollow roller as seen from the front and the side.
Figure 9:
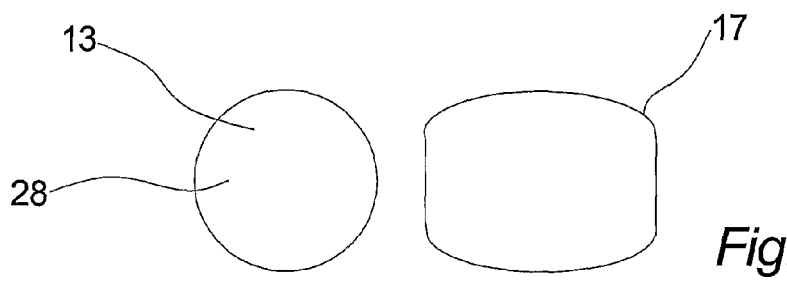
FIG. 9 illustrates an embodiment of a rounded roller as seen from the front and the side.

FIG. 8 illustrates an embodiment of a hollow roller 12 as seen from the front and the side. The rollers 13 in roller bearings 9 as the ones illustrated in FIGS. 4, 8 and 9 are all very sensitive to angle differences between the different rings 24, 25, 26. If one of the rings 24, 25, 26 is under the influence of a heavy load, the design of the bearings 9 could result in such an angle difference, if the rings 24, 25, 26 are not strong and rigid enough. To ensure that the rollers 13 are not damaged by such an angle difference the rollers 13 could be provided with a hole 22 in the middle, providing it with that much flexibility that the roller 12 is not damaged even though the load on it is not evenly distributed.

In this embodiment of the invention the hole 22 is bigger near the ends of the roller 12, to ensure most flexibility where it is most needed, but in another embodiment of the invention the hole could be straight or the flexibility could be provided by a blind hole in one or each end of the roller 12.

FIG. 9 illustrates an embodiment of a rounded roller 28 as seen from the front and the side. As explained above angle differences between the bearing rings 24, 25, 26 can damage the rollers 13 or reduce their life. To provide the bearings 9 with the flexibility enabling it to handle distortion of the bearing rings 24, 25, 26 the rollers 13 could also be provided with a curved roller surface either by making it bulge or by rounding 17 the two edges.

Figure 10:
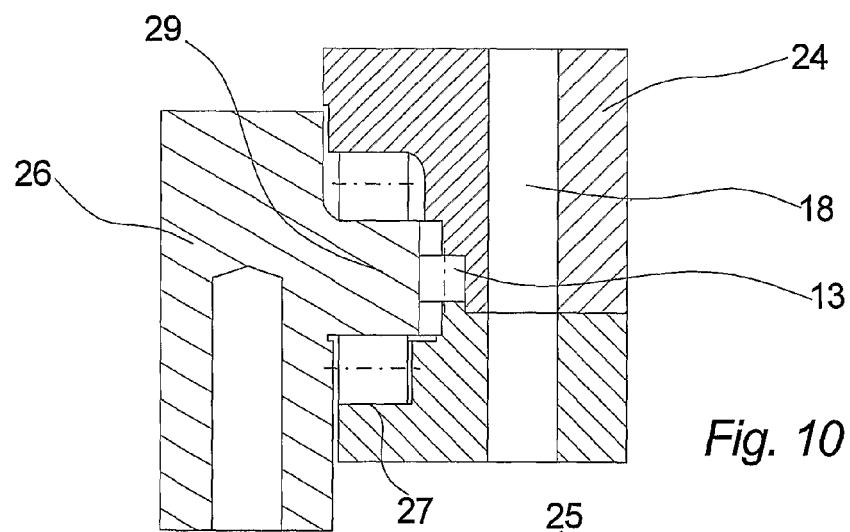
FIG. 10 illustrates a part of a cross section of a pitch bearing comprising rollers.
Figure 11:
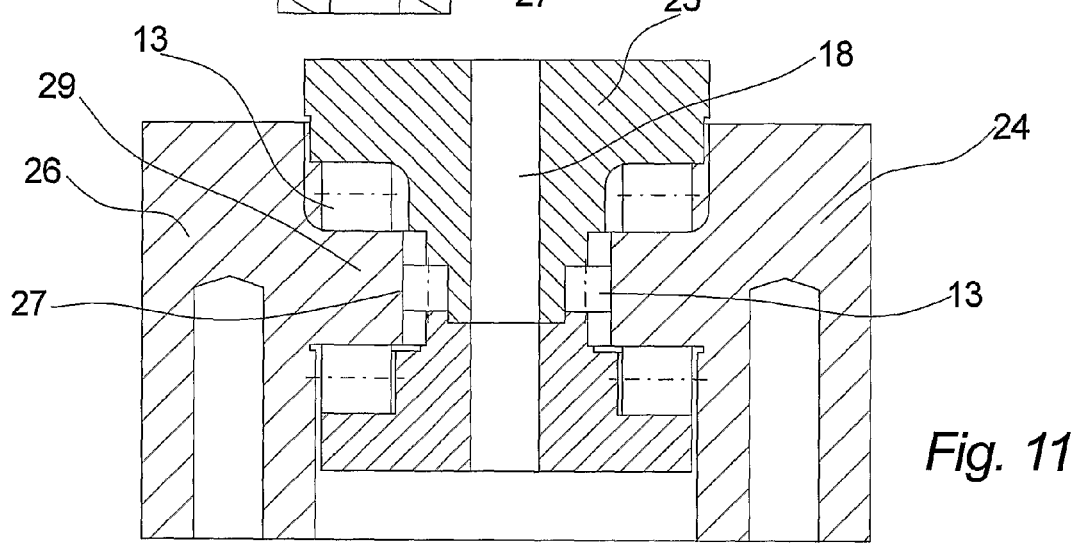
FIG. 11 illustrates a part of a cross section of another pitch bearing comprising rollers.

FIG. 10 and FIG. 11 illustrates parts of cross sections of two different embodiments of pitch bearings 9. In these bearings 9 no angle compensating means are provided, so if the bearing rings 24, 25, 26 are distorted by the loads on and/or from the blades 5, the rollers or their respective opposing contact surfaces could be damaged. In these types of bearings flexibility enhancing means such as angle compensating means 14, inner and/or outer plates 10, 11, hollow rollers 12, rounded rollers 28 or any combination thereof would enable the bearings 9 to transfer a much greater load than otherwise possible without significantly increasing the cost or the weight of the bearings.

Figure 12:
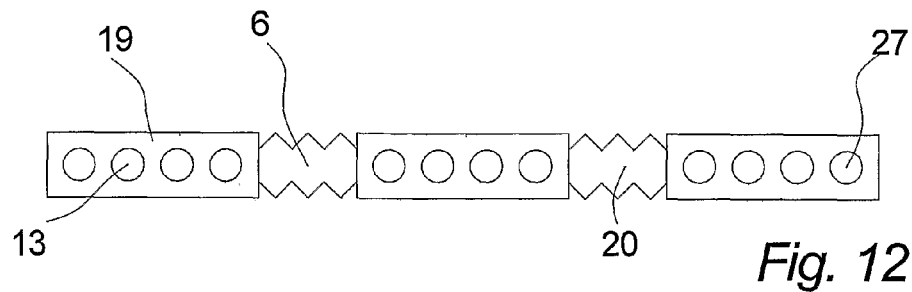
FIG. 12 illustrates an embodiment of rolling element cages and separate compression parts.

FIG. 12 illustrates an embodiment of rolling element cages 19. To ensure that the rolling elements 13 of the pitch bearing 9 are separated and stay in place, the rolling elements 13 are provided with rolling element cages 19. This could be a single 360° cage ensuring a constant distance between all the rolling elements 13, but if one or more bearing rings 24, 25, 26 are distorted, a force could arise forcing one or more rolling elements 13 apart. If the rolling elements 13 mutual distance is fixed, this force could potentially damage the rolling elements 13 or their corresponding contact surfaces on the bearing rings 24, 25, 26. As illustrated in FIG. 12 the rolling element cages 19 could be divided into a number of separate cages 19 kept apart by compression parts 6. The compression parts 6 can be compressed and thereby absorbing some of the separating forces. The compression parts 6 could e.g. be rubber blocks, metal springs or other elastical devices or materials.

In this embodiment of the invention each cage 19 contains 4 balls but in another embodiment of the invention the cage 19 could contain two, three, five, six or more balls or rollers 13.

Figure 13:
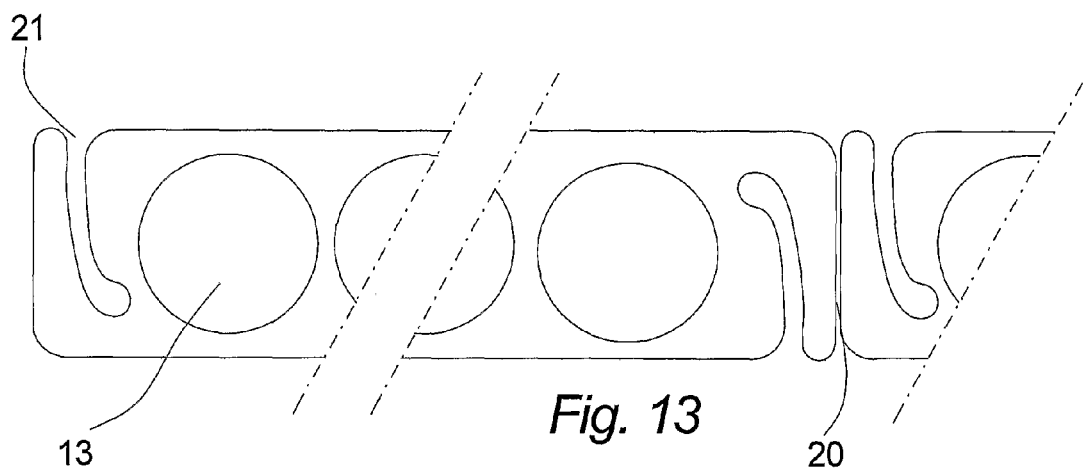
FIG. 13 illustrates an embodiment of rolling element cages comprising compression zones.

FIG. 13 illustrates another embodiment of rolling element cages 19. In this embodiment of the invention each cage 19 comprise a compression zone 20, in form of a transverse slit 21 formed integrally in the cage 19. The cages 19 could be made from some sort of steel plate which then could be flame or laser cut into the desired shape.

Figure 14:
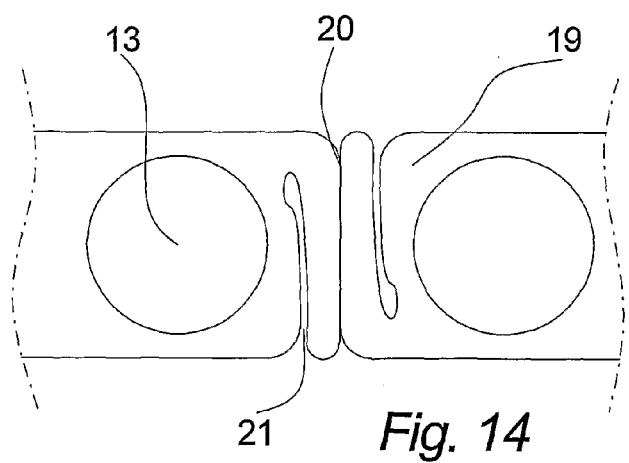
FIG. 14 illustrates the same embodiment of rolling element cages as illustrated in FIG. 13 in a compressed state.

FIG. 14 illustrates the same embodiment of rolling element cages 19 as illustrated in FIG. 13 in a compressed state.

Figure 15:
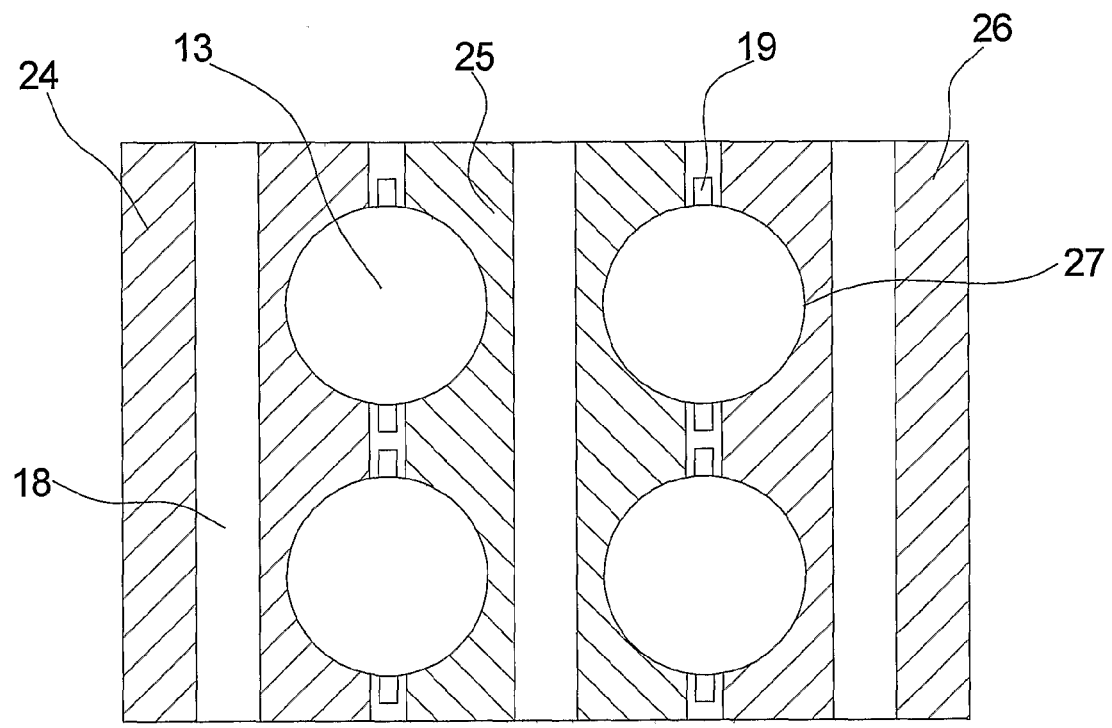
FIG. 15 illustrates a part of a cross section of a pitch bearing comprising rolling element cages.

FIG. 15 illustrates a part of a cross section of an embodiment of a pitch bearing 9 comprising rolling element cages 19.

The invention has been exemplified above with reference to specific examples of separate flexibility enhancing means in pitch bearings 9 for a wind turbine 1. However, it should be understood that the invention is not limited to the particular examples described above but may be designed and altered in a multitude of varieties within the scope of the invention as specified in the claims.

The invention claimed is:

1. A wind turbine comprising:
a hub;
at least two pitch controlled wind turbine blades;
and one or more pitch bearings mounting said blades to said hub, each pitch bearing including an inner bearing ring and outer bearing ring;
wherein said one or more pitch bearings each comprise an outer plate fixed to and extending radially outward from said outer bearing ring for controlling loads in said bearings, said outer plate being fixed to said outer bearing ring at a location spaced from said hub; and
wherein said outer plate is a semicircular ring covering a portion of said outer bearing ring.

2. A wind turbine according to claim 1, wherein said outer plate has an increased width toward a middle of said semicircular ring.

3. A wind turbine according to claim 1, wherein said outer plate covers approximately 180° of said outer bearing ring.

4. A wind turbine according to claim 1, wherein said outer bearing ring is generally cylindrical having a first end and a second end, wherein said first end is adjacent said hub and said second end is spaced away from said first end, said outer plate being coupled to said outer bearing ring adjacent said second end.

5. A wind turbine according to claim 1, wherein said outer plate is provided on a free end of said outer bearing ring.

6. A wind turbine according to claim 1, wherein said inner bearing ring is attached to said blade and said outer bearing ring is attached to said hub.

7. A wind turbine according to claim 6, wherein one or more bolts connect said outer plate to said outer bearing ring and hub, said one or more bolts extending through said outer bearing ring.

8. A wind turbine comprising:
 a hub;
 at least two pitch controlled wind turbine blades; and
 one or more pitch bearings mounting said blades to said hub, each pitch bearing including an inner bearing ring and outer bearing ring;
 wherein said one or more pitch bearings each comprise an outer plate fixed to and extending radially outward from said outer bearing ring and an inner plate fixed to said inner bearing ring for controlling loads in said bearings.

9. A wind turbine according to claim 8, wherein said inner plate includes a hole positioned to provide non-uniform rigidity to said inner bearing ring.

10. A wind turbine according to claim 9, wherein said outer plate is a semicircular ring covering a portion of said outer bearing ring, and wherein said hole in said inner plate is offset from a center of said inner plate toward said semicircular ring.

11. A wind turbine according to claim 8, wherein one or more bolts connect said inner plate to said inner bearing ring and blade, said one or more bolts extending through said inner bearing ring.

12. A wind turbine comprising:
 a hub;
 at least two pitch controlled wind turbine blades; and
 one or more pitch bearings mounting said blades to said hub, each pitch bearing including an inner bearing ring attached to said blade and an outer bearing ring attached to said hub, said outer bearing ring including one or more bolts extending therethrough and into the hub for attaching said outer bearing ring to said hub;
 wherein said one or more pitch bearings each comprise an outer plate fixed to said outer bearing ring and an inner plate fixed to said inner bearing ring for controlling loads in said bearings.

13. A wind turbine according to claim 12, wherein said one or more bolts that attach said outer bearing ring to said hub also fix said outer plate to said outer bearing ring.

* * * * *